United States Patent
Goossens et al.

(10) Patent No.: US 7,999,041 B2
(45) Date of Patent: Aug. 16, 2011

(54) NEUTRAL STATIC POLYCARBONATES, METHODS OF MAKING, AND ARTICLES FORMED THEREFROM

(75) Inventors: Johannes Martinus Dina Goossens, Bergen Op Zoom (NL); Douglas George Hamilton, Dalton, MA (US); Theodorus Lambertus Hoeks, Bergen Op Zoom (NL)

(73) Assignee: Sabic Innovative Plastics IP B.V. (NL)

( * ) Notice: Subject to any disclaimer, the term of this patent is extended or adjusted under 35 U.S.C. 154(b) by 1050 days.

(21) Appl. No.: 11/745,144

(22) Filed: May 7, 2007

(65) Prior Publication Data

US 2010/0137500 A1    Jun. 3, 2010

(51) Int. Cl.
C08L 69/00    (2006.01)
(52) U.S. Cl. .......... 525/462; 528/196; 528/204
(58) Field of Classification Search .......... None
See application file for complete search history.

(56) References Cited

U.S. PATENT DOCUMENTS

| | | | |
|---|---|---|---|
| 6,022,943 A * | 2/2000 | Inoue et al. | 528/196 |
| 6,140,457 A | 10/2000 | LeGrand et al. | |
| 6,194,497 B1 | 2/2001 | Willems et al. | |
| 6,545,122 B1 * | 4/2003 | Elsner et al. | 528/503 |
| 6,949,596 B2 | 9/2005 | Seidel et al. | |
| 6,960,641 B2 | 11/2005 | O'Neil et al. | |
| 2003/0023024 A1 | 1/2003 | Masuki et al. | |
| 2003/0105271 A1 * | 6/2003 | Brack et al. | 528/196 |
| 2003/0153720 A1 * | 8/2003 | Miyamoto et al. | 528/196 |

FOREIGN PATENT DOCUMENTS

| | | |
|---|---|---|
| EP | 897950 A3 | 7/2004 |
| WO | 0050488 | 8/2000 |

OTHER PUBLICATIONS

Schnell, Chemistry and Physics of Polycarbonates, 1964; p. 45.*
International Search Report for International Application No. PCT/US2007/073230, mailed Nov. 30, 2007, 5 pages.
Written Opinion for International Application No. PCT/US2007/073230, mailed Nov. 30, 2007, 8 pages.
ASTM D1003-00, Standard Test Method for Haze and Luminous Transmittance of Transparent Plastics, 6 pages.

* cited by examiner

Primary Examiner — David Buttner
(74) Attorney, Agent, or Firm — Cantor Colburn LLP

(57) ABSTRACT

Disclosed herein is a method of preparing a polycarbonate composition comprising melt blending a first polycarbonate prepared by interfacial polymerization and having hydroxy end groups that are capped with endcapping groups, with a second polycarbonate prepared by melt polymerization and having hydroxy end groups that are capped with endcapping groups, wherein the second polycarbonate has a lower mole percent of endcapping groups than that of the first polycarbonate; wherein an article having a thickness of 3.2 mm and molded from the polycarbonate composition has a haze of less than 3 according to ASTM D1003-00; and wherein a flat article molded from the polycarbonate composition has a surface charge of −2 to +2 kV. A polycarbonate composition and complex article prepared according to the method are also disclosed.

28 Claims, 2 Drawing Sheets

FIG. 1

Blending of interfacial and melt process polycarbonate

% Melt process PC in Interfacial PC

FIG. 2

Relation of static charge and endcap ratio

Endcap ratio (%)

NEUTRAL STATIC POLYCARBONATES, METHODS OF MAKING, AND ARTICLES FORMED THEREFROM

BACKGROUND OF THE INVENTION

This disclosure relates to polycarbonate compositions, and in particular to static resistant polycarbonate compositions, methods of manufacture, and uses thereof.

Polycarbonate is a high-performance plastic with good impact strength (ductility). Polycarbonates, especially aromatic polycarbonates, are routinely used in structural applications, for example, in the form of headlight lens for automotive applications. They are also the common materials for the fabrication of optical data recording media, including optical disks as exemplified by compact audio disks and CD-ROM disks used in computers.

Polycarbonates can accumulate a surface charge of static electricity, which can reduce the desirable qualities of the polycarbonate composition in such applications where it can attract dust and other materials, by compromising the transparency and other surface finish properties of an article prepared from the polycarbonate.

It is known in the art to add different types of anti-static agents to the polycarbonate to reduce dust attraction. U.S. Pat. No. 6,194,497 discloses an anti-static thermoplastic resin composition of 90 to 99.95 weight percent (wt %) of a thermoplastic resin and correspondingly 0.05 to 10 wt % of a halogenated carbon sulfonic acid salt of a polysubstituted phosphonium compound such as a fluorinated phosphonium sulfonate. Antistatic agents, such as tetrabutyl phosphonium perfluorobutanesulfonate (sometimes referred to as "FC-1") have been added to polycarbonate (European Patent No. 897950A3), where a molded part formed from the combination has been disclosed to dissipate an electrostatic surface charge. Prevention of the build up of electrostatic surface charge is also disclosed to have been accomplished by including antistatic end groups in a polymer as in, for example, U.S. Pat. No. 6,140,457 which discloses a di-t-alkylphenyl end group as a preferred static reducing end group. Further, dust patterns are disclosed to have been reduced in polycarbonates by addition of a polyalkylene ether (U.S. Pat. No. 6,949,596).

Polycarbonate is well known for its electrical insulating properties. Typical surface resistivity values are in the range of $10^{18}$ ohm/square. As a result of extrusion and injection molding the surface of the polycarbonate part can have a electrostatic surface charge that is either positive or negative in polarity. In both cases parts formed from the polycarbonates will attract dust from the environment. When the surface is charged negatively the dust patterns appear in a fractalized pattern that is shaped like fern marks. A positive electrostatic surface charge will result in circular halo-like patterns. Both such kinds of pattern are considered aesthetic defects, especially in lighting applications.

A similar problem occurs when complex articles, such as automotive headlamp lenses, are molded from the polycarbonate composition. When exposed to the environment, dust is attracted onto the polycarbonate article and patterns form that may be circular or irregular in nature and that therefore are aesthetically unattractive. This problem may occur even when antistatic agents are present in the composition. However, addition of an antistatic agent in amounts sufficient to reduce the incidence of problem can also degrade the mechanical and optical properties of the polycarbonate.

There accordingly remains a need in the art for polycarbonates having high resistance to the development of charges of static electricity and methods of making the same.

SUMMARY OF THE INVENTION

The above-described and other deficiencies of the art are met by a method of preparing a polycarbonate composition comprising melt blending a first polycarbonate prepared by interfacial polymerization and having hydroxy end groups that are capped with endcapping groups, with a second polycarbonate prepared by melt polymerization and having hydroxy end groups that are capped with endcapping groups, wherein the second polycarbonate has a lower mole percent of endcapping groups than that of the first polycarbonate; wherein an article having a thickness of 3.2 mm and molded from the polycarbonate composition has a haze of less than 3 according to ASTM D1003-00; and wherein a flat article molded from the polycarbonate composition has a surface charge of −2 to +2 kV.

In another embodiment, a method of preparing a polycarbonate composition comprises melt blending 1 to 75 weight percent (wt %) of a first polycarbonate prepared by interfacial polymerization and having hydroxy end groups, wherein greater than or equal to 97 mole percent of the hydroxy end groups are capped with an endcapping group, with 25 to 99 wt % of a second polycarbonate prepared by melt polymerization and having hydroxy end groups, wherein 50 to 90 mole percent of the hydroxy end groups are capped with an endcapping group, wherein the wt % are based on the total weight of the first polycarbonate and the second polycarbonate; wherein 80 to 95 mole percent of the hydroxy end groups present in the polycarbonate composition are capped with an endcapping group; wherein an article having a thickness of 3.2 mm and molded from the polycarbonate composition has a haze of less than 3 according to ASTM D1003-00; and wherein a flat article molded from the polycarbonate composition has a surface charge of −2 to +2 kV.

In yet another embodiment, a polycarbonate composition comprises a first polycarbonate having hydroxy end groups, wherein greater than or equal to 97 mole percent of the hydroxy end groups are capped with an endcapping group, and a second polycarbonate having hydroxy end groups, wherein 50 to 90 mole percent of the hydroxy end groups are capped with an endcapping group; wherein 80 to 95 mole percent of the hydroxy end groups present in the polycarbonate composition are capped with an endcapping group; wherein each of the first polycarbonate and the second polycarbonate comprises repeating carbonate units derived from a bisphenol compound; wherein the polycarbonate composition has less than or equal to 0.001 wt % of residual bisphenol based on the total weight of the polycarbonate composition; wherein the polycarbonate composition does not include an antistatic agent; wherein an article having a thickness of 3.2 mm and molded from the polycarbonate composition has a haze of less than 3 according to ASTM D1003-00; and wherein a flat article molded from the polycarbonate composition has a surface charge of −2 to +2 kV.

In still another embodiment, a molded automotive headlight lens comprises a polycarbonate composition consisting essentially of a first polycarbonate having hydroxy end groups, wherein greater than or equal to 97 mole percent of the hydroxy end groups are capped with an endcapping group, and a second polycarbonate having hydroxy end groups, wherein 50 to 90 mole percent of the hydroxy end groups are capped with an endcapping group; wherein 80 to 95 mole percent of the hydroxy end groups present in the polycarbonate composition are capped with an endcapping group; wherein each of the first polycarbonate and the second polycarbonate comprises repeating carbonate units derived from a bisphenol compound; wherein the polycarbonate composition has less than or equal to 0.001 wt % of residual bisphenol based on the total weight of the polycarbonate composition; wherein the polycarbonate composition does not include an antistatic agent; wherein an article having a thickness of 3.2 mm and molded from the polycarbonate composition has a haze of less than 3 according to ASTM D1003-00; and wherein a flat article molded from the polycarbonate composition has a surface charge of −2 to +2 kV.

In another embodiment, a method of preparing a polycarbonate composition, comprises melt blending a first polycarbonate wherein a flat article molded from the first polycarbonate has a measured surface charge of less than 0 kV, with a second polycarbonate wherein a flat article molded from the second polycarbonate has a measured surface charge of greater than 0 kV, wherein an article having a thickness of 3.2 mm and molded from the polycarbonate composition has a haze of less than 3 according to ASTM D1003-00, and wherein a flat article molded from the polycarbonate composition has a surface charge of −2 to +2 kV.

In another embodiment, a method of preparing a polycarbonate composition, comprises melt blending a first polycarbonate wherein a flat article molded from the first polycarbonate has a measured surface charge of less than 0 kV, with a second polycarbonate wherein a flat article molded from the second polycarbonate has a measured surface charge of greater than 0 kV, and an additive, measuring the surface charge of a flat article molded from the polycarbonate composition, and adjusting the proportion of the first and second polycarbonates as needed to provide a polycarbonate composition wherein a flat article molded from the polycarbonate composition has a surface charge of −2 to +2 kV.

In another embodiment, a complex molded article comprising a polycarbonate composition comprising a first polycarbonate wherein a flat article molded from the first polycarbonate has a measured surface charge of less than about 0 kV, with a second polycarbonate wherein a flat article molded from the second polycarbonate has a measured surface charge of greater than about 0 kV, and an additive, the complex molded article having a maximum positive surface charge ($SC_{max}$) of less than or equal to about +2 kV, and a minimum negative surface charge ($SC_{min}$) of greater than or equal to about −2 kV.

A description of the figures, which are meant to be exemplary and not limiting, is provided below.

The above described and other features are exemplified by the following detailed description.

DETAILED DESCRIPTION OF THE INVENTION

Surprisingly, it has now been found that a static resistant polycarbonate composition can be obtained by a method comprising melt blending a first polycarbonate with a second polycarbonate; wherein the second polycarbonate has a lower end cap ratio (i.e., a lower percentage of hydroxy end groups that are endcapped with an endcapping agent) than that of the first polycarbonate. A flat article molded from the static resistant polycarbonate composition has an electrostatic surface charge of −2 to +2 kV. Advantageously, an article prepared from the polycarbonate composition has low haze and can be made highly transparent. Such an article molded from the polycarbonate composition shows little or no dust patterns. The static resistant polycarbonate composition is useful for manufacturing a wide variety of articles, for example, automotive headlamp lenses.

Polycarbonates disclosed herein have repeating structural carbonate units of the formula (1):

wherein at least 60 percent of the total number of $R^1$ groups contains aromatic organic groups and the balance thereof are aliphatic, alicyclic, or aromatic groups. In one embodiment, each $R^1$ group is a divalent aromatic group, for example derived from an aromatic dihydroxy compound of the formula (2):

$$HO-A^1-Y^1-A^2-OH \qquad (2)$$

wherein each of $A^1$ and $A^2$ is a monocyclic divalent arylene group, and $Y^1$ is a single bond or a bridging group having one or two atoms that separate $A^1$ from $A^2$. In an exemplary embodiment, one atom separates $A^1$ from $A^2$. In another embodiment, when each of $A^1$ and $A^2$ is phenylene, $Y^1$ is para to each of the hydroxyl groups on the phenylenes. Illustrative non-limiting examples of groups of this type are —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging group $Y^1$ can be a hydrocarbon group or a saturated hydrocarbon group such as methylene, cyclohexylidene, or isopropylidene.

Included within the scope of formula are bisphenol compounds of general formula (3):

wherein $R^a$ and $R^b$ each represent a halogen atom or a monovalent hydrocarbon group and can be the same or different; p and q are each independently integers of 0 to 4; and $X^a$ represents a single bond or one of the groups of formulas (4) or (5):

wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, and $R^e$ is a divalent $C_{1-12}$ hydrocarbon group. In particular, $R^c$ and $R^d$ are each the same hydrogen or $C_{1-4}$ alkyl group, specifically the same $C_{1-3}$ alkyl group, even more specifically, methyl.

In an embodiment, $R^c$ and $R^d$ taken together represent a $C_{3-20}$ cyclic alkylene group or a heteroatom-containing $C_{3-20}$ cyclic alkylene group comprising carbon atoms and heteroatoms with a valency of two or greater. These groups can be in the form of a single saturated or unsaturated ring, or a fused polycyclic ring system wherein the fused rings are saturated, unsaturated, or aromatic. A specific heteroatom-containing cyclic alkylene group comprises at least one heteroatom with a valency of 2 or greater, and at least two carbon atoms. Exemplary heteroatoms in the heteroatom-containing cyclic alkylene group include —O—, —S—, and —N(Z)—, where Z is a substituent group selected from hydrogen, hydroxy, $C_{1-12}$ alkyl, $C_{1-12}$ alkoxy, or $C_{1-12}$ acyl.

In a specific exemplary embodiment, $X^a$ is a substituted $C_{3-18}$ cycloalkylidene of the formula (6):

(6)

wherein each $R^r$, $R^p$, $R^q$, and $R^t$ is independently hydrogen, halogen, oxygen, or $C_{1-12}$ organic group; 1 is a direct bond, a carbon, or a divalent oxygen, sulfur, or —N(Z)— wherein Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (6) will have an unsaturated carbon-carbon linkage where the ring is fused. When k is 1 and i is 0, the ring as shown in formula (6) contains 4 carbon atoms, when k is 2, the ring as shown contains 5 carbon atoms, and when k is 3, the ring contains 6 carbon atoms. In one embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group.

When k is 3 and i is 0, bisphenols containing substituted or unsubstituted cyclohexane units are used, for example bisphenols of formula (7):

(7)

wherein substituents $R^{a'}$ and $R^{b'}$ can be aliphatic or aromatic, straight chain, cyclic, bicyclic, branched, saturated, or unsaturated, and $R^g$ is $C_{1-12}$ alkyl or halogen, r and s are independently integers from 0 to 4, and t is an integer of 0 to 10. It will be understood that hydrogen fills each valency when r is 0, s is 0, and t is 0, in one embodiment, each $R^{a'}$ and $R^{b'}$ is independently $C_{1-12}$ alkyl. In a specific embodiment, where r and/or s is 1 or greater, at least one of each of $R^{a'}$ and $R^{b'}$ are disposed meta to the cyclohexylidene bridging group. The substituents $R^{a'}$, $R^{b'}$, and $R^g$ may, when comprising an appropriate number of carbon atoms, be straight chain, cyclic, bicyclic, branched, saturated, or unsaturated. In a specific embodiment, $R^{a'}$, and $R^{b'}$, are $R^g$ are each $C_{1-4}$ alkyl, specifically methyl. In still another embodiment, $R^{a'}$, $R^{b'}$, and $R^g$ is a $C_{1-3}$ alkyl, specifically methyl, r and s are 0 or 1, and t is 0 to 5, specifically 0 to 3. Useful cyclohexane-containing bisphenols of formula (7) where t is 3, r and s are 0, and $R^g$ is methyl include, for example those derived from the reaction product of two moles of a phenol with one mole of a hydrogenated isophorone such as e.g., 3,3,5-trimethylcyclohexanone, are useful for making polycarbonate polymers with high glass transition temperatures and high heat distortion temperatures. Such isophorone-bridged, bisphenol-containing polycarbonates, or a combination comprising at least one of the foregoing with other bisphenol polycarbonates, can be obtained from Bayer Co. under the APEC® trade name.

Other useful dihydroxy compounds have the formula (8):

(8)

wherein each $R^h$ is independently a halogen atom, a $C_{1-10}$ hydrocarbyl such as a $C_{1-10}$ alkyl group, a halogen substituted $C_{1-10}$ hydrocarbyl such as a halogen-substituted $C_{1-10}$ alkyl group, and n is 0 to 4. The halogen is usually bromine.

Some illustrative examples of dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9 to bis (4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, and the like, as well as combinations comprising at least one of the foregoing dihydroxy compounds.

Specific examples of bisphenol compounds that can be represented by formula (2) include 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine ("PPPBP"), and 1,1-bis(4-hydroxy-3-methylphenyl)cyclohexane ("DMBPC"). Combinations comprising at least one of the foregoing dihydroxy compounds can also be used.

"Polycarbonate" as used herein includes homopolycarbonates and copolymers comprising different $R^1$ moieties in the carbonate (referred to herein as "copolycarbonates"). In one specific embodiment, the polycarbonate is a linear homopolymer or copolymer comprising units derived from bisphenol A, in which each of $A^1$ and $A^2$ is p-phenylene and $Y^1$ is isopropylidene in formula (2). More specifically, at least 60%, particularly at least 80% of the $R^1$ groups in the polycarbonate are derived from bisphenol A.

The first and the second polycarbonates can be manufactured by processes such as interfacial polymerization and melt polymerization. Although reaction conditions for interfacial polymerization can vary, an exemplary process generally involves dissolving or dispersing a dihydroxy compound as reactant in aqueous caustic soda or potash, adding the resulting mixture to a water-immiscible solvent medium, and contacting the reactants with a carbonate precursor in the presence of a catalyst such as, for example, triethylamine or a phase transfer catalyst, under controlled pH conditions, for example, pH 8 to 11. The most commonly used water immiscible solvents include methylene chloride, 1,2-dichloroethane, chlorobenzene, toluene, and the like.

Exemplary carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In an exemplary embodiment, an interfacial polymerization reaction to form carbonate linkages uses phosgene as a carbonate precursor, and is referred to as a phosgenation reaction.

Among the phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3$-$[CH_3(CH_2)_3]_3NX$, and $CH_3[CH_3(CH_2)_2]_3NX$, wherein X is Cl⁻, Br⁻, a $C_{1-8}$ alkoxy group or a $C_{6-18}$ aryloxy group.

An effective amount of a phase transfer catalyst can be 0.1 to 10 wt % based on the weight of the dihydroxy compound in the polymerization reaction mixture. In one embodiment, the reaction is a phosgenation reaction. In another embodiment, the effective amount of phase transfer catalyst is 0.5 to 2 wt % based on the weight of the dihydroxy compound in the reaction mixture.

The second polycarbonate can also be prepared by a melt polymerization process. Generally, in a melt polymerization process, a polycarbonate can be prepared by co-reacting, in a molten state, a dihydroxy compound and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polycarbonate polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl)carboxylate, bis(4-acetylphenyl)carboxylate, or a combination comprising at least one of the foregoing.

Useful transesterification catalysts for use in melt polymerization process can include phase transfer catalysts of formula $(R^3)_4Q^+X$ described above, wherein each $R^3$, Q, and X are as defined above. Exemplary transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing.

Branched polycarbonate blocks can be prepared by adding a branching agent during polymerization of the first or the second polycarbonate. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane ("THPE"), isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl)phenol), 4-chloroformyl phthalic anhydride, trimesic acid, and benzophenone tetracarboxylic acid. The branching agents can be added at a level of 0.05 to 2.0 wt %, based on the total weight of the polycarbonate composition. Mixtures comprising linear polycarbonates and branched polycarbonates can be used.

An endcapping agent (also referred to as a "capping agent" or "chain stopper") is included during polymerization. The endcapping agent is used to cap the hydroxy end groups (—OH) of the polycarbonate polymer chain during interfacial or melt polymerization process, by reacting with the hydroxy group to form a covalent bond. By controlling the amount of the endcapping agent and/or polymerization conditions such as the reaction temperature, the mole percent (mol %) of the hydroxy end groups that are capped can be controlled. The endcapping agent also competes with and thereby limits the addition of monomers to a growing polymer chain, and therefore controls the molecular weight growth rate and the overall molecular weight of the polycarbonate. Control of hydroxy end groups can be effectively achieved by use of a variety of endcapping agents resulting in a variety of endgroups. In an embodiment, para-substituted (p-) phenolic end groups are useful for endcapping the polycarbonate polymer chain, but the endgroups are not limited thereto.

Any suitable endcapping agents can be used provided that such agents do not significantly adversely affect the desired properties of the polycarbonate composition, such as transparency, electrostatic surface charge, and the like. Exemplary endcapping agents include certain mono-phenolic compounds, mono-carboxylic acid chlorides, and/or mono-chloroformates. Mono-phenolic endcapping agents are exemplified by monocyclic phenols such as phenol and $C_1$-$C_{22}$ alkyl-substituted phenols such as p-cumyl-phenol, resorcinol monobenzoate, and p- and tertiary-butyl phenol; and mono-ethers of diphenols, such as p-methoxyphenol. Alkyl-substituted phenols with branched chain alkyl substituents having 8 to 9 carbon atoms can be specifically mentioned. Certain mono-phenolic UV absorbers can also be used as endcapping agents, for example, 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like. The hydroxy groups from similar compounds used as additives such as benzotriazole UV absorbers and primary antioxidants may have hindered phenolic groups, which are believed to affect electrostatic surface charge less.

In one embodiment, the endcapping agent is a mono-phenolic compound having the formula:

wherein Y is a hydrogen, halogen, $C_{1-6}$ alkyl group, $C_{1-3}$ alkoxy group, $C_{7-12}$ arylalkyl, alkylaryl, or nitro group; and y is 0 to 4. In another embodiment, the endcapping agent is phenol or para-t-butyl phenol.

Mono-carboxylic acid chlorides can also be used as endcapping agents. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to 22 carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations thereof.

The relative amount of the endcapping agents used in the manufacture of polycarbonates will depend on a number of considerations, for example, the desired mole percent of endcapping (end cap ratio), the type of $R^1$ groups, the use of a branching agent, and the desired molecular weight of the polycarbonate among other considerations. As used herein, the term "end cap ratio" means the mole percent of the hydroxy end groups of the polycarbonate polymer chain that are capped with an endcapping group. For example, a polycarbonate having an end cap ratio of 85 mol % means that 85 mol % of the hydroxy end groups of the polycarbonate polymer, chain are capped with an endcapping agent.

In some embodiments, the first polycarbonate can have greater than or equal to 97 mol %, more specifically 98 mol %, or still more specifically 99 mol %, of the hydroxy end groups capped with an endcapping agent. In one embodiment, the endcapping agent is a phenol or para-t-butyl phenol.

The second polycarbonate generally has a lower mole percent of hydroxy end groups that are capped by an endcapping agent than that of the first polycarbonate. In an embodiment, 50 to 90 mol %, more specifically 60 to 80 mol %, or still more specifically 70 to 80 mol % of the hydroxy end groups are capped with an endcapping agent. In one embodiment, the endcapping agent is a phenol or para-t-butyl phenol.

The first and the second polycarbonates can have a weight average molecular weight (Mw) of about 5,000 to about 100,000 grams per mole (g/mol), specifically about 10,000 to about 60,000 g/mol, even more specifically 15,000 to 40,000 g/mol, still more specifically about 16,000 to about 35,000 g/mol as measured by gel permeation chromatography (GPC), using a crosslinked styrene-divinylbenzene column and calibrated to polycarbonate references. GPC samples are prepared at a concentration of about 1 mg/ml, and are eluted at a flow rate of about 0.5 to about 1.5 ml/min.

The polycarbonate composition can be prepared by combining, such as by melt blending, the first polycarbonate and the second polycarbonate. The first polycarbonate and the second polycarbonate can be melt blended at different weight ratios. In some embodiments, 1 to 95 wt %, more specifically, 1 to 85 wt %, and still more specifically 1 to 75 wt % of the first polycarbonate is melt blended with 5 to 99 wt % more specifically 15 to 99 wt %, or even more specifically 25 to 99 wt % of the second polycarbonate, wherein the wt % of the first and the second polycarbonates are based on the total weight of the first polycarbonate and the second polycarbonate.

The total mole percent of the hydroxy end groups in the polycarbonate composition that are capped by an endcapping agent plays an important role in the properties of the composition. In some embodiments, the polycarbonate compositions have 75 to 95 mole percent (mol %), more specifically, 80 to 95 mol %, or still more specifically 80 to 85 mol % of the total number of moles of hydroxy end groups capped with an endcapping agent.

The polycarbonate compositions described above can have desirable properties such as good transparency and neutral electrostatic surface charge. In one embodiment, an article having a thickness of 3.2 mm and molded from the polycarbonate composition has a haze of less than or equal to 10, specifically less than or equal to 5, more specifically less than or equal to 3, and still more specifically less than or equal to 2, according to ASTM D1003-00. In another embodiment, a flat article molded from the polycarbonate composition has a surface charge of −3 to +3 kV, specifically −2 to +2 kV, more specifically −1 to +1 kV, and still more specifically, about 0 kV. As used herein, "about 0 kV" means −0.1 to +0.1 kV. It will be understood that where electrostatic surface charge is specified, the value represents an average value for the measured surface charges.

Polycarbonates as prepared herein can have varying levels of hydroxy-containing end groups on the termini of the polymer chains, where the overall concentration of the end groups depends on the molecular weight of the polymers, and the extent of endcapping of the polymers by endcapping groups as provided in the preparative methods. Endcapping groups when included in the polymerization step act as a molecular weight adjustment by blocking the hydroxy reactive sites on the polymerizable monomers (such as e.g., bisphenol), where molecular weight decreases with increasing endcapping group concentration. However, of interest herein is the consideration that as the degree of endcapping of the available hydroxy end groups approaches 100% of the total moles of hydroxy end group, the surface charge of the resultant polymer also increases to a positive measured surface charge for an article molded therefrom of up to +10 kV or higher, depending on the concentration of end groups. Conversely, lower levels of endcapping group concentration (i.e., higher hydroxy end group concentration) can provide an article molded from such a polycarbonate with a negative surface charge of down to about −10 kV or lower, depending on the level of endcapping group as a function of the total moles of hydroxy end group.

Articles molded from polycarbonates can have a variable surface charge and a commensurately variable propensity for attracting charged particulates (i.e., dust) from environmental sources, and as a result, can under certain circumstances collect dust patterns on the surface of an article prepared from the polycarbonate as discussed above. This has been found to be a particularly undesirable property where the surface of the article should be kept free of such dust-related surface defects such as for applications where such dust patterns may interfere with light transmission, or similarly where a dust pattern would be visible under the conditions of use and where the visibility of such patterns is not desired. Generally, such applications involve manufacture of transparent articles with an interior surface that is not exposed to environmental conditions or cannot readily be cleaned during use, such as for example a lens for a light fixture such as an automotive headlight lens, commercial transparent light covers, and the like.

As discussed above, addition of antistatic agents may not provide the desired or intended effect of reducing the propensity of the polycarbonate to attract dust in a way that is consistent or uniform across the article. Antistatic agents such as FC-1 or polyalkylene oxides can migrate to the air-polymer interface (e.g., the surface of an article) during molding or extruding because of surface activity of the antistatic agent. The presence of the antistatic agent on the surface can result in a non-uniform variation in the surface electrostatic surface charge of the article, and may therefore still allow the accumulation of surface charge on the article. Therefore inclusion of an antistatic agent may not eliminate the propensity of the article to attract dust as intended. Further, addition of antistatic agents in levels sufficient to eliminate the undesired surface electrostatic surface charge can cause immiscibility and phase separation at a small scale which can manifest as visible haze. Such haze is undesirable, particularly in articles for which a high transparency (i.e., high transmission and low haze) is needed, or where a rich depth (also referred to as "jetness") of color is desired, in particular for dark colors such as e.g., a "piano black" color.

Polycarbonates prepared by interfacial polymerization generally have higher endcapping group content of greater than or equal to about 97 mol percent based on the total number of moles of hydroxy end groups, and such polymers when molded can form articles with surface charges of up to about +10 kV. Similarly, polycarbonates prepared using melt polymerization methods generally have endcapping group content of about 50 to about 90 mol % based on the total number of moles of hydroxy end groups, and such polycarbonates when molded generally form articles with surface charges of less than 0 kV, specifically as low as about −10 kV or lower. A polycarbonate composition as disclosed herein therefore can comprise a first polycarbonate prepared by interfacial polymerization, in combination with a second polycarbonate prepared by melt polymerization, provided that an article molded from the resulting polycarbonate composition has a neutral surface charge as described above.

Surface charge of articles that are prepared from the polycarbonate composition can further be affected by the impurities and/or additives present in the polycarbonate composition. The surface charge of articles prepared from polycarbonates having impurities such as, for example, residual (i.e., unpolymerized) hydroxy-containing monomer, such as for example a bisphenol monomer, present in the constituent polycarbonates (and by definition the polycarbonate composition prepared therefrom) have been observed to have undesirable effects on the polarity and magnitude of the surface charge of articles prepared with sufficiently high levels of such residual monomers. It is therefore desirable to maintain a consistently low level of residual monomers in the constituent polycarbonates and in the polycarbonate composition. In an embodiment, the polycarbonate composition comprises a low level of residual monomer of less than or equal to 0.01 wt %, specifically less than or equal to 0.05 wt %, and more specifically less than or equal to 0.001 wt % of residual monomer based on the total weight of the polycarbonate composition. In a specific embodiment, the polycarbonate composition comprises low levels of a bisphenol monomer.

The polycarbonate composition can comprise one or more suitable additives in addition to the first and the second polycarbonates, with the proviso that the additives are selected so as to not significantly adversely affect the desired properties such as transparency and surface static properties of the polycarbonate. Such additives can be mixed at a suitable time during the mixing of the components for forming the polycarbonate composition.

The polycarbonate composition generally does not comprise an antistatic agent. However, it may optionally comprise an antistatic agent to further improve the antistatic properties of the composition. The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides polyether-polyamide (polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example PELESTAT® 6321 antistatic additive (available from Sanyo) or PEBAX® MH1657 resin (available from Atofina), IRGASTAT® P18 and P22 antistatic agents (available from Ciba). Other polymeric materials that can be used as antistatic agents are inherently conducting polymers such as polyaniline (commercially available as PANIPOL®EB conductive polymer from

Panipol), polypyrrole and polythiophene (commercially available from Bayer), which retain some of their intrinsic conductivity after melt processing at elevated temperatures. In one embodiment, carbon fibers, carbon nanofibers, carbon nanotubes, carbon black, or a combination comprising at least one of the foregoing can be used in a polymeric resin containing chemical antistatic agents to render the composition electrostatically dissipative. Antistatic agents are generally used in amounts of 0.0001 to 5 parts by weight, based on 100 parts by weight of the polymer component of the polycarbonate composition.

The polycarbonate composition can comprise a flame retardant. Useful flame retardant additives include, for example, flame retardant salts such as alkali metal salts of perfluorinated $C_{1-16}$ alkyl sulfonates such as potassium perfluorobutane sulfonate (Rimar salt), potassium perfluorooctane sulfonate, tetraethylammonium perfluorohexane sulfonate, potassium diphenylsulfone sulfonate (KSS), and the like; and salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. Rimar salt and KSS are particularly useful in the polycarbonate compositions disclosed herein.

Useful flame retardant additives also include organic compounds that include phosphorus, bromine, and/or chlorine. Non-brominated and non-chlorinated phosphorus-containing flame retardants can be used in certain applications for regulatory reasons, for example organic phosphates and organic compounds containing phosphorus-nitrogen bonds. One type of exemplary organic phosphate is an aromatic phosphate of the formula $(GO)_3P=O$, wherein each G is independently an alkyl, cycloalkyl, aryl, alkylaryl, or arylalkyl group, provided that at least one G is an aromatic group. Two of the G groups can be joined together to provide a cyclic group, for example, diphenyl pentaerythritol diphosphate. Exemplary aromatic phosphates include, phenyl bis(dodecyl)phosphate, phenyl bis(neopentyl)phosphate, phenyl bis(3,5,5'-trimethylhexyl) phosphate, ethyl diphenyl phosphate, 2-ethylhexyl di(p-tolyl) phosphate, bis(2-ethylhexyl)p-tolyl phosphate, tritolyl phosphate, bis(2-ethylhexyl)phenyl phosphate, tri(nonylphenyl) phosphate, bis(dodecyl)p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each G is aromatic, for example, diphenyl phosphate, tricresyl phosphate, isopropylated triphenyl phosphate, and the like.

Di- or poly-functional aromatic phosphorus-containing compounds are also useful, for example, compounds of the formulas below:

wherein each $G^1$ is independently a hydrocarbon having 1 to 30 carbon atoms; each $G^2$ is independently a hydrocarbon or hydrocarbonoxy having 1 to 30 carbon atoms; each X is independently a bromine or chlorine; m is 0 to 4, and n is 1 to 30. Exemplary di- or polyfunctional aromatic phosphorus-containing compounds include resorcinol tetraphenyl diphosphate (RDP), the bis(diphenyl)phosphate of hydroquinone and the bis(diphenyl)phosphate of bisphenol A, respectively, their oligomeric and polymeric counterparts, and the like.

Exemplary flame retardant additives containing phosphorus-nitrogen bonds include phosphonitrilic chloride, phosphorus ester amides, phosphoric acid amides, phosphonic acid amides, phosphinic acid amides, tris(aziridinyl)phosphine oxide.

When present, the foregoing flame retardant additives are generally present in amounts of 0.01 to 10 wt %, more specifically 0.02 to 5 wt %, or even more specifically 0.02 to 1 wt %, based on the total weight of the first or the second polycarbonate.

The polycarbonate composition can also include an impact modifier. Suitable impact modifiers are typically high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. Combinations of impact modifiers can be used.

A specific type of impact modifier is an elastomer-modified graft copolymer comprising (i) an elastomeric (i.e., rubbery) polymer substrate having a glass transition temperature $(T_g)$ less than 10° C., more specifically less than −10° C., or more specifically −40° to −80° C., and (ii) a rigid polymeric superstrate grafted to the elastomeric polymer substrate. Materials suitable for use as the elastomeric phase include, for example, conjugated diene rubbers, for example polybutadiene and polyisoprene; copolymers of a conjugated diene with less than 50 wt % of a copolymerizabie monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl (meth)acrylates; elastomeric copolymers of $C_{1-8}$ alkyl (meth)acrylates with butadiene and/or styrene; or combinations comprising at least one of the foregoing elastomers. Materials suitable for use as the rigid phase include, for example, monovinyl aromatic monomers such as styrene and alpha-methyl styrene, and monovinylic monomers such as acrylonitrile, acrylic acid, methacrylic acid, and the $C_1$-$C_6$ esters of acrylic acid and methacrylic acid, specifically methyl methacrylate. As used herein, the term "(meth)acrylate" encompasses both acrylate and methacrylate groups.

Specific exemplary elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN).

Impact modifiers, when present, are generally present in amounts of 0.01 to 10 wt %, more specifically, 0.1 to 5 wt %, based on the total weight of the polycarbonate composition.

Possible fillers or reinforcing agents include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polycarbonate polymeric matrix, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly (phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, finite, quartz, quartzite, perlite, tripoli, diatomaceous earth, carbon black, or the like, or combinations comprising at least one of the foregoing fillers or reinforcing agents.

The fillers and reinforcing agents can be coated with a layer of metallic material to facilitate conductivity, or surface treated with silanes to improve adhesion and dispersion with the polycarbonate polymeric matrix. In addition, the reinforcing fillers can be provided in the form of monofilament or multifilament fibers and can be used individually or in combination with other types of fiber, through, for example, co-weaving or core/sheath, side-by-side, orange-type or matrix and fibril constructions, or by other methods known to one skilled in the art of fiber manufacture. Exemplary co-woven structures include, for example, glass fiber-carbon fiber, carbon fiber-aromatic polyimide (aramid) fiber, and aromatic polyimide fiberglass fiber or the like. Fibrous fillers can be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids.

Fillers, where used, are generally present in amounts of less than or equal to 10 wt %, more specifically, 0.1 to 5 wt %, based on the total weight of the polycarbonate composition.

Exemplary antioxidant additives include, for example, organophosphites such as tris(nonyl phenyl)phosphite, tris(2, 4-di-t-butylphenyl)phosphite ("IRGAFOS® 168" antioxidant, available from Ciba), bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis [methylene(3,5-di-tert-butyl-4-hydroxyhydrocinnamate)] methane ("IRGANOX® 1076" antioxidant, available from Ciba), or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants are generally used in amounts of 0.0001 to 1 wt %, more specifically, 0.01 to 0.5 wt %, based on the total weight of the polycarbonate composition.

Exemplary heat stabilizer additives include, for example, organophosphites such as triphenyl phosphite, tris-(2,6-dimethylphenyl)phosphite, tris-(mixed mono-and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers are generally used in amounts of 0.0001 to 1 wt %, based on the total weight of the polycarbonate composition.

Light stabilizers and/or ultraviolet light (UV) absorbers can also be used. Exemplary light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers are generally used in amounts of 0.0001 to 1 wt %, more specifically, 0.01 to 0.5 wt %, based on the total weight of the polycarbonate composition.

Exemplary UV absorbers include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB® UV 5411 light stabilizer, available from Cytec); 2-(2H-benzotriazol-2-yl)-4-(tert-butyl)-6-(sec-butyl)phenol (TINUVIN® 350 light stabilizer, available from Ciba), 2-hydroxy-4-n-octyloxybenzophenone (CYASORB® 531 light stabilizer, available from Cytec); 2-[4,6-bis(2,4-dimethylphenyl)-1,3,5-triazin-2-yl]-5-(octyloxy)-phenol (CYASORB® 1164 light stabilizer, available from Cytec); 2,2'-(1,4-phenylene)bis(4H-3,1-benzoxazin-4-one) (CYASORB® UV-3638 light stabilizer, available from Cytec); 1,3-bis[(2-cyano-3,3-diphenylacryloyl)oxy]-2,2-bis[[(2-cyano-3,3-diphenylacryloyl)oxy]methyl]propane (UVINUL® 3030 UV stabilizer, available from BASF); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than or equal to 100 nanometers; or the like, or combinations comprising at least one of the foregoing UV absorbers. UV absorbers are generally used in amounts of 0.0001 to 1 wt %, more specifically, 0.01 to 0.5 wt %, based on the total weight of the polycarbonate composition.

Plasticizers, lubricants, and/or mold release agents can also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl)phosphate of hydroquinone and the bis(diphenyl)phosphate of bisphenol-A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate (PETS), and the like; combinations of methyl stearate and hydrophilic and hydrophobic nonionic surfactants comprising polyethylene glycol polymers, polypropylene glycol polymers, poly(ethylene glycol-co-propylene glycol)copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like. Such materials are generally used in amounts of 0.001 to 1 wt %, more specifically 0.01 to 0.5 wt %, based on the total weight of carbonate composition.

Anti-drip agents can also be used in the polycarbonate composition, for example a fibril forming or non-fibril forming fluoropolymer such as polytetrafluoroethylene (PTFE). The anti-drip agent can be encapsulated by a rigid copolymer as described above, for example styrene-acrylonitrile copolymer (SAN). PTFE encapsulated in SAN is known as TSAN. Encapsulated fluoropolymers can be made by polymerizing the encapsulating polymer in the presence of the fluoropolymer, for example an aqueous dispersion. TSAN can provide significant advantages over PTFE, in that TSAN can be more readily dispersed in the composition. An exemplary TSAN can comprise 50 wt % PTFE and 50 wt % SAN, based on the total weight of the encapsulated fluoropolymer. The SAN can comprise, for example, 75 wt % styrene and 25 wt % acrylonitrile based on the total weight of the copolymer. Alternatively, the fluoropolymer can be pre-blended in some manner with a second polymer, such as for, example, an aromatic polycarbonate or SAN to form an agglomerated material for use as an anti-drip agent. Either method can be used to produce an encapsulated fluoropolymer. Antidrip agents are generally used in amounts of 0.1 to 5 wt %, based on the total weight of the polycarbonate composition.

Radiation stabilizers can also be present, specifically gamma-radiation stabilizers. Exemplary gamma-radiation stabilizers include alkylene polyols such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexanediol, and the like; cycloalkylene polyols such as 1,2-cyclopentanediol, 1,2-cyclohexanediol, and the like; branched alkylenepolyols such as 2,3-dimethyl-2,3-butanediol (pinacol), and the like, as well as alkoxy-substituted cyclic or acyclic alkanes. Unsaturated alkenols are also useful, examples of which include 4-methyl-4-penten-2-ol, 3-methyl-pentene-3-ol, 2-methyl-4-penten-2-ol, 2,4-dimethyl-4-pene-2-ol, and 9 to decen-1-ol, as well as tertiary alcohols that have at least one hydroxy substituted tertiary carbon, for example 2-methyl-2,4-pentanediol (hexylene glycol), 2-phenyl-2-butanol, 3-hydroxy-3-methyl-2-butanone, 2-phenyl-2-butanol, and the like, and cyclic tertiary alcohols such as 1-hydroxy-1-methyl-cyclohexane. Certain hydroxymethyl aromatic compounds that have hydroxy substitution on a saturated carbon attached to an unsaturated carbon in an aromatic ring can also be used. The hydroxy-substituted saturated carbon can be a methylol group (—CH$_2$OH) or it can be a member of a more complex hydrocarbon group such as —CR$^4$HOH or —CR$_2^4$OH wherein R$^4$ is a complex or a simple hydrocarbon. Specific hydroxy methyl aromatic compounds include benzhydrol, 1,3-benzenedimethanol, benzyl alcohol, 4-benzyloxy benzyl alcohol and benzyl benzyl alcohol. 2-Methyl-2,4-pentanediol, polyethylene glycol, and polypropylene glycol are often used for gamma-radiation stabilization. Gamma-radiation stabilizing compounds are typically used in amounts of 0.1 to 10 wt %, based on the total weight of the polycarbonate composition.

Additives such as certain UV absorbers and antioxidants that contain hydroxy groups, for example, glycerol mono stearate, bisphenol A (sometimes referred to herein as "bisphenol acetone"), and TINUVIN® 350 light stabilizer, can affect end cap ratios and the level of un-capped para phenol hydroxy group. Some of these additives are believed to have some effect on the electrostatic surface charge properties of the polycarbonate composition.

Melt volume flow rate (often abbreviated "MVR") measures the rate of extrusion of a polycarbonate composition through an orifice at a prescribed temperature and load. The polycarbonate composition disclosed herein can have an MVR, measured at 300° C. under a load of 1.2 kg, of 0.1 to 200 cubic centimeters per 10 minutes (cm$^3$/10 min), or more specifically 1 to 100 cm$^3$/10 min, or even more specifically 2 to 30 cm$^3$/10 min.

Polycarbonate compositions disclosed herein can be manufactured by various methods. For example, the first polycarbonate, the second polycarbonate, and other optional components are first blended in a HENSCHEL-Mixer® high speed mixer. Other low shear processes, including but not limited to hand mixing, can also accomplish this blending. The blend is then fed into the throat of a single or twin screw extruder via a hopper. Alternatively, at least one of the components can be incorporated into the composition by feeding directly into the extruder at the throat and/or downstream through a sidestuffer. Additives can also be compounded into a masterbatch desired polymeric resin and fed into the extruder. The extruder generally operated at a temperature higher than that necessary to cause the composition to flow. The extrudate is immediately quenched in a water bath and pelletized. The pellets, so prepared, when cutting the extrudate can be one-fourth inch long or less as desired. Such pellets can be used for subsequent molding, shaping, or forming.

In some embodiments, the polycarbonate composition comprises less than or equal to 1 wt %, specifically less than or equal to 0.8 wt %, and more specifically less than or equal to 0.5, wt % of an additive, based on the total weight of the polycarbonate composition. In one embodiment, the additive is a flame retardant, a UV absorber, a plasticizer, a release agent, an antioxidant, or a combination comprising at least one of the foregoing additives. In an exemplary embodiment, the UV absorber is CYASORB® UV 5411 light stabilizer or TINUVIN® 350 UV light stabilizer. In another exemplary embodiment, the mold release agent is PETS. In another exemplary embodiment, the antioxidant is IRGAFOS® 168 antioxidant or IRGANOX® 1076 antioxidant.

A method of preparing a polycarbonate composition therefore comprises, in an embodiment, melt blending the first polycarbonate and the second polycarbonate at a suitable temperature, for example, 270 to 390° C. In another embodiment, the polycarbonate is prepared by melt blending a first polycarbonate prepared by interfacial polymerization and having hydroxy end groups that are capped with endcapping groups, with a second polycarbonate prepared by melt polymerization and having hydroxy end groups that are capped with endcapping groups, wherein the second polycarbonate has a lower mole percent of endcapping groups than that of the first polycarbonate, wherein a flat article molded from the polycarbonate composition has a surface charge of −2 to +2 kV. In a specific embodiment, the method consists essentially of melt blending the first and second polycarbonates. In another embodiment, an additive can be added.

In another embodiment, a method of preparing a polycarbonate composition comprises melt blending a first polycarbonate wherein a flat article molded from the first polycarbonate has a measured surface charge of less than about 0 kV, with a second polycarbonate wherein a flat article molded from the second polycarbonate has a measured surface charge of greater than about 0 kV; measuring the surface charge of a flat article molded from the polycarbonate composition; and adjusting the proportion of the first and second polycarbonates as needed to provide a polycarbonate composition wherein a flat article molded from the polycarbonate composition has a surface charge of −2 to +2 kV. In an embodiment, an additive can also be included in the polycarbonate composition.

Shaped, formed, or molded articles comprising the polycarbonate compositions are also provided. The polycarbonate compositions can be molded into useful shaped articles by a variety of means such as injection molding, extrusion, rotational molding, blow molding and thermoforming to form articles such as, for example, automotive headlight lenses, optical data recording medium, computer and business machine housings such as housings for monitors, handheld electronic device housings such as housings for cell phones, electrical connectors, and components of lighting fixtures, ornaments, home appliances, and the like.

In an embodiment, a method of manufacturing an article comprises melt blending the first polycarbonate and the second polycarbonate to form the polycarbonate composition, extruding the polycarbonate composition; and molding the extruded composition into an article. In an embodiment, the extruding is done with a single screw extruder or a twin screw extruder.

It has surprisingly been found that the surface charge properties of an article molded from a polycarbonate composition can be controlled by a method involving selectively blending polycarbonates having different end capping levels as a function of the molar number of hydroxy end groups (i.e., wherein articles prepared from the polycarbonates would have different surface charges) to achieve a polycarbonate composition which when molded to form the article exhibits a neutral surface charge. As used herein, "neutral" with respect to surface charge means a net electrostatic surface charge of −2 to +2 kV. In an embodiment, a first polycarbonate which when molded to provide an article provides a surface charge of greater than 0 kV for the article, is combined with a second polycarbonate which when molded to provide an article prow net electrostatic surface charge of less than 0 kV for the article, to form a polycarbonate composition. The net electrostatic surface charge of an article molded from the polycarbonate composition is neutral. It has been found that when the total moles of endcapping groups based on the total number of hydroxy end groups for the polycarbonate composition is about 80 to 95 mol %, the surface charge of an article prepared from such a composition provides the desired net electrostatic surface charge performance. An article prepared from such a composition has a low level of surface defects resulting from the surface charge and attraction of dust.

It has further been found that a consistent level of surface electrostatic surface charge can be obtained in an article by blending a first polycarbonate which provides a positive charge with a second polycarbonate which provides a negative charge, where the proportions of the first and second polycarbonates are selected such that the net surface charge for an article molded from the resulting polycarbonate composition is neutral as defined above. Thus, in an embodiment, a molded article comprises a polycarbonate composition which includes a first polycarbonate wherein a flat article molded from the first polycarbonate has a measured surface charge of less than 0 kV, with a second polycarbonate wherein a flat article molded from the second polycarbonate has a measured surface charge of greater than 0 kV, and an additive, the molded article, having a maximum positive electrostatic surface charge ($SC_{max}$) of less than or equal to about +4 kV, specifically less than or equal to about +3 kV, and more specifically less than or equal to about +2 kV. Similarly, the minimum negative electrostatic surface charge ($SC_{min}$) is greater than or equal to about −4 kV, specifically greater than or equal to about −3 kV, and more specifically greater than or equal to about −2 kV. In an embodiment, the article is a complex molded article that is not uniform in flatness and shape. In an exemplary embodiment, the molded article is an automotive headlight lens.

In another embodiment, the electrostatic charge gradient across the complex molded article is defined by the absolute value difference between $SC_{max}$ and $SC_{min}$ as measured at any two points on the surface of the complex molded article. Thus, in another embodiment, an article molded from the polycarbonate composition has an electrostatic charge gradient of less than or equal to about 8 kV, specifically less than or equal to about 6 kV, and more specifically less than or equal to about 4 kV.

In one embodiment, articles molded from polycarbonate compositions show no dust patterns, i.e., circular patterns, "fern marks", and like patterns, that are readily visible to the naked eye at a distance of about 18 inches upon exposure to dust.

The invention is further illustrated by the following non-limiting examples.

EXAMPLES

All polycarbonate compositions except where indicated were compounded on a Werner & Pfleiderer co-rotating twin screw extruder (Length/Diameter (L/D) ratio=30/1, vacuum port located near die face), with enough distributive and dispersive mixing elements to produce good mixing between the components of the polymer compositions. The compositions were subsequently molded according to ISO 294 on a Netstal or Engel injection-molding machine. Compositions were compounded and molded at a temperature of 270 to 390° C., although it will be recognized by one skilled in the art that the method is not be limited to these temperatures.

The electrostatic surface charge (also referred to as "surface potential") was measured using a Simco FMX-003 field-meter (range: −20 to +20 kV). Endgroup level was determined using proton nuclear magnetic resonance (NMR) spectrometry at 500 MHz field strength in deuterated chloroform as a solvent, at a sample concentration of about 1 to about 5 mg/ml. Unless otherwise specified, all polymer molecular weights (e.g., Mw) are reported in grams per mole (g/mol). Melt-volume flow rate (MVR) was determined at 300° C. under a 1.2 Kg downforce, according to ASTM D1238-04. Percent transmission (% T) and haze were each measured on 2.5 mm molded plaques or 3.2 mm molded disks using a spectrophotometer according to ASTM D1003-00, as indicated. Yellowness index (YI) was measured on 2.5 mm molded plaques or molded disks a spectrophotometer according to AS™ D1925-70, as indicated.

Examples 1 to 3

Examples 1 to 3 (Exs. 1 to 3) illustrate the method highlighting the effect of weight ratios between individual polycarbonates in a polycarbonate blend on electrostatic surface charges on molded polycarbonate blends.

In Exs. 1 to 3, three medium viscosity phenol endcapped bisphenol A polycarbonates (MW of each is about 26,000) were selected for molding compact disks at melt temperature of 385° C. All polycarbonate compositions in Exs. 1 to 3 contain 0.3 wt % of a UV absorber (CYASORB® UV 5411 UV absorber from Cytec), 0.3 wt % of a mold release agent (PETS, available as GLYCOLUBE® P ester from Lonza), 0.036 wt % of an antioxidant (IRGAFOS® 168 antioxidant, available from Ciba), and 0.02 wt % of hindered phenol antioxidant (IRGANOX® 1076 antioxidant, available from Ciba). The polymerization process used to prepare each polycarbonate and the end cap ratios are shown in Table 1. The polycarbonate composition in Ex. 3 was a 50/50 (w/w) blend of the polycarbonate in Ex. 1 and the polycarbonate in Ex. 2.

Compact disks having a thickness of 1.1 mm were molded from each polycarbonate composition (weight of 16 grams each) and submitted for surface charge (kV) measurement and artificial dust tests. The dust test was done by exposure to dust created from a vial of ammonia and a vial of hydrochloric acid. The results of the tests are summarized in Table 1.

TABLE 1

| Ex. ID | Polycarbonate (PC) Synthesis Process | End Cap Ratio, mol % | Electrostatic surface charge, kV | Dust patterns |
|---|---|---|---|---|
| Ex. 1 | Interfacial | >99 | +10.3 | Circle |
| Ex. 2 | Melt | 70 to 80 | −4.2 | Fern marks |
| Ex. 3 | 50/50 (w/w) Blend | ND[a] | +4.3 | Circle |

[a]Not determined.

Data in Table 1 indicates that almost completely endcapped polycarbonate (Ex. 1) showed a positive electrostatic surface charge upon molding. Polycarbonate that is endcapped between 70 to 80 mol % (Ex. 2) resulted in negative electrostatic surface charge upon molding. And 50/50 (w/w) blend of polycarbonates of Ex. 1 and Ex. 2 resulted in an electrostatic surface charge that is about in the middle.

Figure 1:
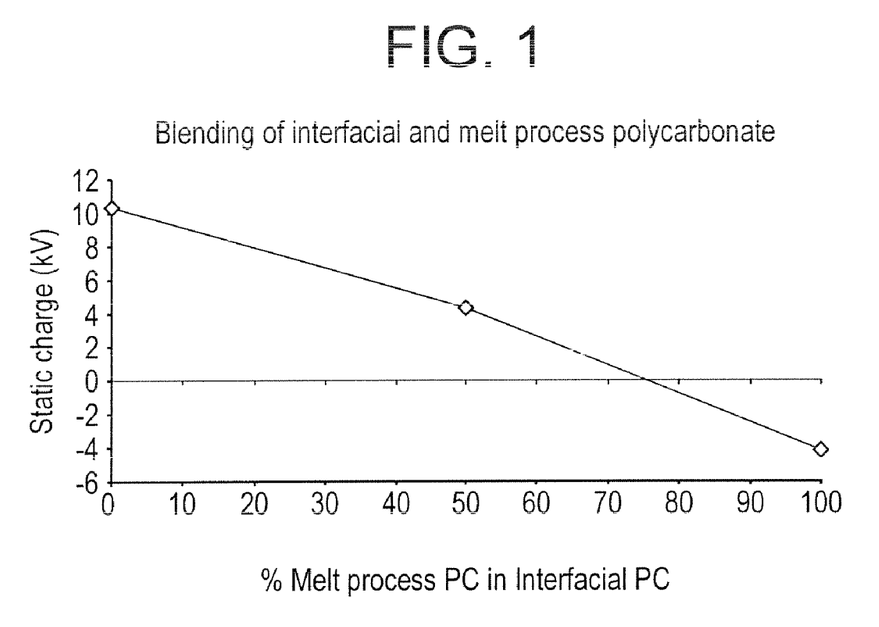
FIG. 1 is a plot of static charge versus percent by weight of melt process polycarbonate for a blend of melt process and interfacial process polycarbonates.

FIG. 1 shows the profile of the electrostatic surface charges on molded polycarbonates vs. the weight ratios between polycarbonates of Ex. 2 and Ex. 1. This figure suggests that the polycarbonate blend containing about 25 wt % of the polycarbonate of Ex. 1 and 75 wt % of the polycarbonate of Ex. 2 had a electrostatic surface charge close to 0 kV, and a phenol end cap level of about 77 to 85 mol %.

Examples 4 to 7

Exs. 4 to 7 illustrate the effect of end cap ratios of polycarbonates on electrostatic surface charges on molded polycarbonate parts.

In Exs. 4 to 7, four medium viscosity phenol endcapped polycarbonates (MW of each is about 26,000) were selected for molding compact disks at melt temperature of 300° C. All polycarbonate compositions have the same additives as that used in Ex. 1 (0.3 wt % of CYASORB® UV 5411 UV absorber (from Cytec), 0.3 wt % of PETS (GLYCOLUBE® P ester from Lonza), 0.036 wt % of IRGAFOS® 168 antioxidant (available from Ciba), and 0.02 wt % of IRGANOX® 1076 antioxidant (available from Ciba)). The polymerization process used to prepare each polycarbonate and the end cap ratios are shown in Table 2.

Disks (thickness 12 mm, weight of 29.3 grams) were molded from each polycarbonate composition. The total weight of a molded part (runners and additional parts in addition to the disk) is about 95 grams. Molded parts were submitted for surface charge (kV) measurement and artificial dust tests as described in Ex. 1. The results of the tests are summarized in Table 2.

TABLE 2

| Ex. ID | PC Synthesis Process | End Cap Ratio, mol % | Electrostatic surface charge, kV | Dust patterns |
|---|---|---|---|---|
| Ex. 4 | Interfacial | >99 | +6.8 | Circle |
| Ex. 5 | Melt | 65 | −3.9 | Fern marks |
| Ex. 6 | Melt | 75 to 78 | −3.3 | Fern marks |
| Ex. 7 | Melt | >92 | +1.4 | Almost free of patterns |

Figure 2:
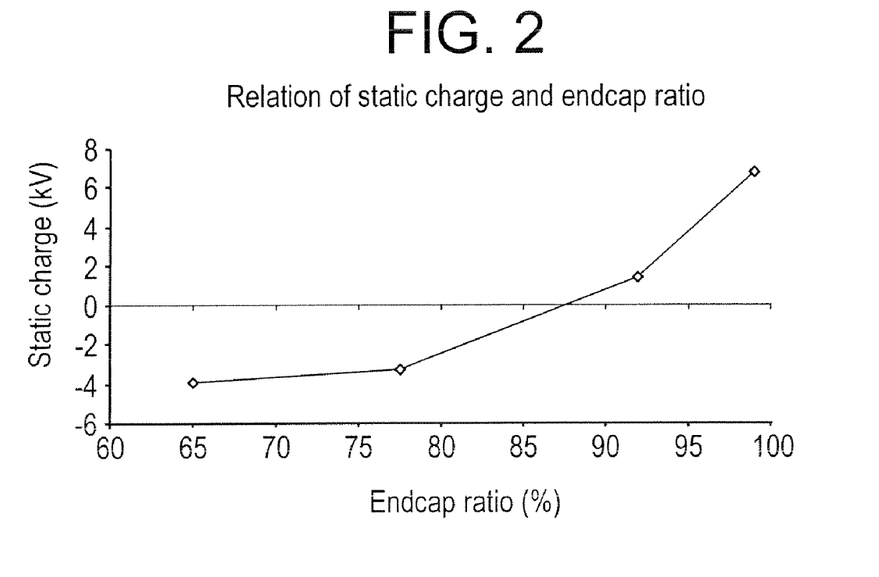
FIG. 2 is a plot of static charge versus endcap ratio for exemplary polycarbonate compositions.

As seen in Table 2, Ex. 4, prepared using a polycarbonate synthesized using interfacial polymerization has a positive electrostatic surface charge which exhibits circular dust patterns in a test article. Examples 5 and 6, each prepared using a polycarbonate prepared by a melt polymerization process both have surface charges of less than 0 and exhibit "fern mark" dust patterns. Example 7, which is prepared using a single polycarbonate polymer prepared by melt polymerization and having an endcapping level of greater than 92 mol % has a surface electrostatic surface charge for the compact disk that is within the performance level desired (−2 to +2 kV). FIG. 2 is a plot of end cap ratio versus surface electrostatic surface charge for the data in Table 2, and which shows the profile of the electrostatic surface charges on molded polycarbonate parts vs. the end cap ratios of the polycarbonates. This figure suggests that in order to obtain a molded part which exhibits an electrostatic surface charge of about zero kV, the end cap ratio is likely to be between 85 and 90 mol %. While the data of Table 2 and FIG. 2, and Example 7 in particular, demonstrates that the endcapping level of the polymer provides the appropriate control of the surface electrostatic surface charge, it can be concluded from this that use of a single polymer with a particular endgroup level that provides the desired surface electrostatic surface charge performance is impractical from the standpoint of batch-to-batch reproducibility and targeted performance, particularly so where an even tighter tolerance to electrostatic surface charge is desired (i.e., −0.5 to +0.5 kV or narrower).

Examples 8 to 15

Examples 8 to 15 illustrate the effect of additives that contain phenolic groups on electrostatic surface charges on molded polycarbonate parts.

Additives (glycerol mono-stearate or "GMS", stearic acid) or compounds ordinarily present in the polycarbonate in residual amounts (residual compounds such as e.g., bisphenol-A (BPA), and that have phenolic —OH groups were added to medium viscosity phenol endcapped polycarbonates (Mw~26,000). The amount of phenolic —OH end groups can either be increased by means of chemical structure of the additive (having a phenolic —OH group) or other compound present, or by chemical reaction of the polymer to create additional phenolic —OH end groups. As a result of chain scission, concentration of phenolic —OH end groups increased and molecular weight decreased. Reduction in molecular weight results in an increase in measured Melt Viscosity Ratio (MVR). All polycarbonate compositions have the same additives as those used in Ex. 1 (0.3 wt % of CYASORB® UV 5411 UV absorber (from Cytec), 0.3 wt % of PETS (GLYCOLUBE® P ester from Lonza), 0.036 wt % of IRGAFOS® 168 antioxidant (available from Ciba), and 0.02 wt % of IRGANOX® 1076 antioxidant (available from Ciba). These polycarbonates differ in end cap ratios.

Plaques (thickness 2.5 mm) and disks (thickness 3.2 mm) were molded at 300° C. The weight of a disk is 29.3 grams and that of a plaque is 13.3 grams. The total weight of a molded part (runners and additional parts in addition to the disk or plaque) is about 95 grams. The concentrations of para phenol —OH end groups (parts per million, or "ppm") in the molded parts were measured by proton NMR spectrometry. In addition molded parts were submitted for artificial dust test and surface charge tests as described in Ex. 1. The results of the tests are summarized in Table 3.

Data in Table 3 shows that as a result of the addition of GMS (Exs. 9 and 10), the molecular weight of the polycarbonate decreased somewhat compared to that without GMS (Ex. 8), as expressed in MVR increase. The concentrations of para phenol —OH end groups of polycarbonates with GMS also increased compared to that without GMS. The addition of BPA (Exs. 11 to 13) increased the level of the para phenol —OH end groups and the MVR. In general, increased levels of para phenol —OH end groups in polycarbonate resulted in a higher negative electrostatic surface charge after molding.

Addition of stearic acid at a load of 0.1% (Ex. 15) had little effect on para phenol —OH end groups compared to that without the stearic acid (Ex. 14). It is believed that stearic acid migrates to the surface and is responsible for a shift towards a more positive electrostatic surface charge.

The correlation between para phenol —OH end groups and surface electrostatic surface charge (surface potential) is apparently not linear. Processing conditions, such as the flow rate of the polycarbonate composition into the mold during injection, the shear during extrusion and injection, extrusion temperature, mold temperature, injection temperature, and the nature of additives also influence electrostatic surface charge after molding. For example, increased shear (from a higher injection rate) has been associated with a more negative electrostatic surface charge for the resulting molded part.

Examples 16 to 19

Examples 16 to 19 illustrate the effect of release agent PETS and UV-absorber on electrostatic surface charges on molded polycarbonate parts.

Under the same conditions to as those in Ex. 8, four formulations based on a medium viscosity phenol endcapped polycarbonate (Mw~26,000) were molded and evaluated for electrostatic surface charge. The polycarbonate was produced using a melt polymerization process and had an end cap ratio of about 75 mol % and para phenol —OH end group of about 735 ppm. All formulations contained 0.036% IRGAFOS® 168 antioxidant and 0.02% IRGANOX® 1076 antioxidant, but with varying amounts of PETS (LOXIOL® EP8578 release agent, available from Cognis) and TINUVIN® 350 UV absorber. The loadings of release agent PETS and UV-absorber TINUVIN® 350 UV absorber are shown in Table 4.

Plaques (thickness 2.5 mm) and disks (thickness 3.2 mm) were molded at 300° C. and submitted for surface charge tests as described in Ex. 1. The results of the tests are summarized in Table 4.

TABLE 3

| Ex. ID | PC Synthesis Process | Additive | Additive loading, wt % | Electrostatic surface charge, kV 3.2 mm | Electrostatic surface charge, kV 2.5 mm | Dust patterns | —OH conc., ppm | MVR, 300° C./1.2 kg |
|---|---|---|---|---|---|---|---|---|
| Ex. 8 | Interfacial | — | — | 8 | 9 | Circle | 68 | 12.5 |
| Ex. 9 | Interfacial | GMS | 0.1 | −3 | −3 | Fern marks | 70 | 12.9 |
| Ex. 10 | Interfacial | GMS | 0.3 | −7 | −6 | Fern marks | 152 | 22 |
| Ex. 11 | Interfacial | BPA | 0.01 | 5 | 4 | Circle | 67 | 12.3 |
| Ex. 12 | Interfacial | BPA | 0.1 | 4 | 5 | Circle | 220 | 13 |
| Ex. 13 | Interfacial | BPA | 1 | −2 | 0 | Some fern marks | 1467 | 19.6 |
| Ex. 14 | Melt | — | — | −7 | −5 | Fern marks | 728 | 14.3 |
| Ex. 15 | Melt | Stearic acid | 0.1 | −1/1[b] | 3 | Some fern marks | 726 | 14.5 |

[b]All reported static charge values are an average. In case of −1/1 this means that the average is between −1 and +1 kV.

TABLE 4

| Ex. ID | PC Synthesis Process | Additive | Additive loading, wt % | Electrostatic surface charge, kV | | MVR, 300° C./1.2 kg |
|---|---|---|---|---|---|---|
| | | | | 3.2 mm | 2.5 mm | |
| Ex. 16 | melt | — | 0 | −6 | −12 | 13.6 |
| Ex. 17 | melt | PETS TINUVIN ® 350 | 0.3 0.3 | −8 | −6 | 14.5 |
| Ex. 18 | melt | PETS | 0.3 | −5 | −8 | 14.2 |
| Ex. 19 | melt | TINUVIN ® 350 | 0.3 | −9 | −12 | 14.1 |

At a thickness of 3.2 mm, the measured electrostatic surface charges for TINUVIN® 350 containing samples (Exs. 17 and 19) are more negative compared to formulations not containing TINUVIN® 350 (Exs. 16 and 18). It is believed that the hindered phenolic —OH of the benzotriazol UV-absorber had some effect on the observed electrostatic surface charge.

More shear (i.e., a higher injection rate) was necessary in order to fill the mold for the 2.5 mm plaque, as compared to the rate required for filling the 3.2 mm disk. As mentioned hereinabove, the electrostatic surface charge of a molded article shifts to a lower charge value (more negative value) with increasing injection rate. Therefore inclusion of the mold release agent PETS is believed to reduce the shear, thereby resulting in less negative (i.e., more positive) electrostatic surface charge as measured.

Examples 20 to 28

Examples 20 to 28 illustrate the effect of blending interfacial polycarbonate and melt polycarbonate on electrostatic surface charges on molded polycarbonate parts.

Under the same conditions as in Ex. 4, medium viscosity (Mw~26,000) polycarbonates prepared via melt process was blended with polycarbonates prepared via interfacial process. The end cap ratio of the melt polycarbonate was about 75 mol % and that of the interfacial polycarbonate >99 mol %. All polycarbonates contained 0.036% IRGAFOS® 168 antioxidant and 0.02% IRGANOX® 1076 antioxidant, 0.3 wt % PETS (LOXIOL® EP8578 release agent, available from Cognis), and 0.3 wt % TINUVIN® 350 UV absorber.

Plaques (thickness 2.5 mm) and disks (thickness 3.2 mm) were molded at 300° C. and submitted for surface charge and dust pattern tests as described in Ex. 1. The results of the tests are summarized in Table 5.

TABLE 5

| Ex. ID | Ratio of Polycarbonate, wt % | | Electrostatic surface charge, kV | | Dust Pattern |
|---|---|---|---|---|---|
| | Melt | Interfacial | 3.2 mm | 2.5 mm | |
| Ex. 20 | 100 | 0 | −5.6 | −6.2 | Fern marks |
| Ex. 21 | 90 | 10 | −9.8 | −6.8 | Fern marks |
| Ex. 22 | 80 | 20 | −9.3 | −11.2 | Fern marks |
| Ex. 23 | 70 | 30 | −6.3 | −10.9 | Fern marks |
| Ex. 24 | 60 | 40 | −8.3 | −8.6 | Fern marks |
| Ex. 25 | 20 | 80 | −12.4 | −8.4 | Fern marks |
| Ex. 26 | 10 | 90 | −4 | −6 | Fern marks only on 2.5 mm plaque |
| Ex. 27 | 5 | 95 | −2.4 | −4.2 | No pattern |
| Ex. 28 | 0 | 100 | 11 | 17 | Circle |

Data in Table 5 indicates that the molded part containing 5 wt % of the melt polycarbonate and 95 wt % of the interfacial polycarbonate seems to be beneficial for avoiding generation of dust patterns. This polycarbonate blend had an end cap ratio of about 96 to 98 mol % and about 100 to 150 ppm para phenol —OH group.

In addition, molded parts obtained in Exs. 20 to 24 and Ex. 28 were submitted for optical property measurements. These measurements included light transmission (% T, ASTM D1003-00), haze (ASTM D1003-00), and yellowness index (YI) (ASTM D1925-70). The results of the measurements are summarized in Table 6.

TABLE 6

| | Ratio of Polycarbonate, wt % | | 2.5 mm plaque | | | 3.2 mm disk | | |
|---|---|---|---|---|---|---|---|---|
| Ex. ID | Melt | Interfacial | Transmission, % | Haze | YI | Transmission, % | Haze | YI |
| Ex. 20 | 100 | 0 | 90.3 | 0.33 | 3.1 | 90.1 | 0.44 | 3.5 |
| Ex. 21 | 90 | 10 | 90.6 | 0.33 | 2.9 | 90.4 | 0.36 | 3.3 |
| Ex. 22 | 80 | 20 | 90.6 | 0.34 | 2.9 | 90.5 | 0.34 | 3.3 |
| Ex. 23 | 70 | 30 | 90.6 | 0.33 | 2.9 | 90.4 | 0.36 | 3.4 |
| Ex. 24 | 60 | 40 | 90.7 | 0.35 | 2.8 | 90.5 | 0.36 | 3.3 |
| Ex. 28 | 0 | 100 | 90.8 | 0.27 | 2.8 | 90.6 | 0.37 | 3.3 |

Data in Table 6 indicates that blending of interfacial and melt polycarbonates appears to have minimal effect on optical properties of the polycarbonate blends.

Examples 29 to 35

Examples 29 to 35 illustrate the effect of endcapping group and end cap ratio on electrostatic surface charges on molded polycarbonate compositions.

In these examples, two melt process polycarbonates were used. One was low viscosity melt polycarbonate (Mw~21,700), which has an end cap ratio of 80 to 85 mol %. The other was high viscosity melt polycarbonate (Mw~29,600), which had an end cap ratio of 65 to 70 mol %. Medium viscosity interfacial polycarbonate (Mw~26,000) capped with phenol or p-t-butyl phenol (end cap ratio>99 mol % for each) was blended with different melt process polycarbonates, as shown in Table 7. All polycarbonate compositions contained 0.036% IRGAFOS® 168 antioxidant and 0.02% IRGANOX® 1076 antioxidant, 0.3 wt % PETS (LOXIOL® EP8578 release agent, available from Cognis), and 0.3 wt % TINUVIN® 350 UV absorber.

Disks (thickness 3.2 mm) were molded at 300° C. and submitted for surface charge and dust pattern tests using methods as described in Ex. 1. The results of the tests are summarized in Table 7.

TABLE 7

| Ex. ID | Ratio of Polycarbonate, wt % | | Electrostatic surface charge, kV | Dust Pattern |
|---|---|---|---|---|
| | Melt (Mw) | Interfacial (End cap) | | |
| Ex. 29 | 0 | 100 (phenol end cap) | 7.7 | Circle |
| Ex. 30 | 10 (Mw ~21,700) | 90 (phenol end cap) | 5.2 | Circle |
| Ex. 31 | 15 (Mw ~21,700) | 85 (phenol end cap) | −0.7 | No pattern |
| Ex. 32 | 5 (Mw ~29,600) | 95 (phenol end cap) | 1.5 | No pattern |
| Ex. 33 | 0 | 100 (p-t-butyl phenol end cap) | 5.6 | Circle |
| Ex. 34 | 10 (Mw ~21,700) | 90 (p-t-butyl phenol end cap) | 4.5 | Circle |
| Ex. 35 | 5 (Mw ~29,600) | 95 (p-t-butyl phenol end cap) | 2 | No pattern |

Data in Table 7 indicates that the type of end cap, phenol or p-t-butyl phenol, has a minimal to no effect on the observed dust patterns and measured electrostatic surface charge. Blends that have an end cap level of 94 to 97 mol % seem to be free of dust patterns and have an electrostatic surface charge close to zero kV. The end cap level corresponds to a para phenol —OH level of 100 to 200 ppm.

Examples 36 to 39

Examples 36 to 39 illustrate the effect of the size of molded parts on electrostatic surface charges.

Headlamp lenses were molded at a melt temperature of 300° C. from polycarbonate compositions as shown in Table 7. Additive types and amounts for the polycarbonate compositions used in these examples were the same as those used in Exs. 29 to 35. The interfacial polycarbonates were medium viscosity phenol end capped polycarbonates (Mw~26,000). Both the low viscosity (Mw~21,700) and the high viscosity (Mw~29,600) melt polycarbonates were also phenol end capped.

In one molding cycle two lenses were produced. The weight of one lens was about 620 grams. The average thickness of a lens was about 3 mm. Lenses were evaluated on dust pattern and measured for average electrostatic surface charge over the lens on the inside of the lens. The outside of the lens will be coated in the end use application. Results are summarized in Table 8.

Figure 3:
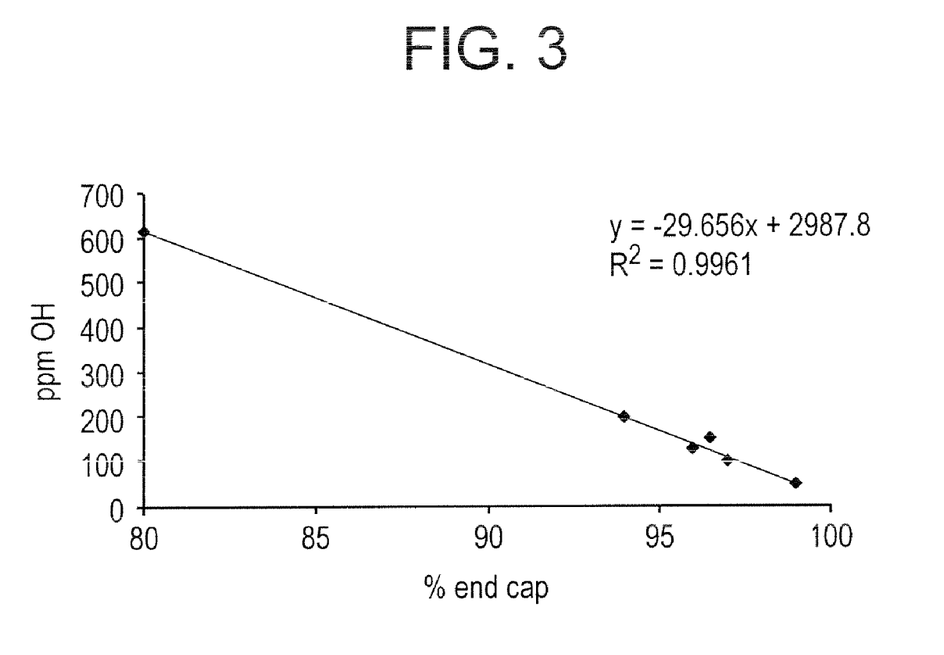
FIG. 3 is a plot of OH content (in ppm by weight) versus % endcap (molar basis) for exemplary polycarbonate compositions.

Data in Table 8 suggests that for a bigger sample (Exs. 36 to 39), an end cap ratio between 94 and 96 mol % (200 and 140 ppm of para phenol —OH) does not produce a dust pattern free molded part. Instead, the optimal end cap level seems to be about 83 mol % for the molded lenses (Ex. 39). This would correspond to a para phenol —OH level of about 525 ppm as determined from FIG. 3, which shows a plot of para phenol —OH in ppm vs. end cap mol %. The correlation shown in FIG. 3 can be used as an alternative to proton NMR to determine the approximate hydroxy end group level for a given polycarbonate composition.

Examples 40 to 43

Examples 40 to 43 illustrate the effect of the size of a molded part on electrostatic surface charges.

The four materials from Exs. 36 to 39 (labeled, respectively, as Exs. 40 to 43 in Table 9, below) were injection molded under comparable conditions on two different tools. On one tool 3.2 mm disks (29.3 gram) and 2.5 mm plaques (13.3 gram) were molded. On the other tool "fryer pan" lids (i.e., disc-shaped plaques with a projection on one side, having a weight of 340 grams and a thickness of 2.4 mm) were molded. The sizes of these pan lids were in between lenses and disks in weight. Additive types and amounts for the polycarbonates used in Examples 40 to 43 were identical to those used in Exs. 36 to 39, respectively. The interfacial polycarbonates used were medium viscosity phenol end capped polycarbonates (Mw~26,000). Both the low viscosity (Mw~21,700) and the high viscosity (Mw~29,600) melt polycarbonates were also phenol end capped.

Figure 4:
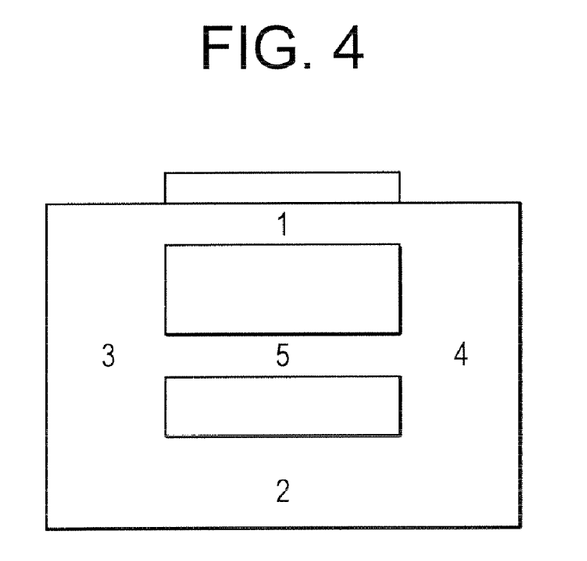
FIG. 4 is a diagram of surface charge testing points for an article.

Molded parts were measured for electrostatic surface charge. For the fryer pan lids the electrostatic surface charge was measured at selected positions or points as shown in FIG. 4. Results are summarized in Table 9.

TABLE 8

| Ex. ID | Ratio of Polycarbonate, wt % | | Average Electrostatic surface charge, kV | Dust Pattern | End Cap Ratio, mol % | MVR, 300° C./1.2 kg |
|---|---|---|---|---|---|---|
| | Melt (Mw) | Interfacial | | | | |
| Ex. 36 | 0 | 100 | 10/20[c] | Circle | 99 | 12.5 |
| Ex. 37 | 5 (Mw ~29,600) | 95 | 12 | Circle | 94 | 12.2 |
| Ex. 38 | 15 (Mw ~21,700) | 85 | 11 | Circle | 96 | 12.9 |
| Ex. 39 | 100 (Mw ~21,700) | 0 | −1/2[c] | No pattern | 83 | 12.5 |

[c]All reported static charge values are an average. In case of −1/2 this means that the average is between −1 and +2 kV. In case of 10/20 this means that the average is between +10 kV and +20 kV

TABLE 9

| | Ratio of polycarbonate, wt % | | Electrostatic surface charge, kV (Tool 1) | | Electrostatic surface charge, kV (Tool 2) | | | | | |
|---|---|---|---|---|---|---|---|---|---|---|
| Ex. ID | Melt (Mw) | Interfacial | 2.5 mm | 3.2 mm | Point 1 | Point 2 | Point 3 | Point 4 | Point 5 | Average |
| Ex. 40 | 0 | 100 | 3.8 | 4.2 | 2.4 | 6.8 | 4.5 | 4.2 | 4.7 | 4.5 |
| Ex. 41 | 5 (High Mw) | 95 | −1.1 | −1.9 | 2.3 | 7.0 | 3.4 | 3.0 | 4.2 | 4.0 |
| Ex. 42 | 15 (Low Mw) | 85 | −0.4 | −1.9 | 2.2 | 6.1 | 3.3 | 2.7 | 3.5 | 3.6 |
| Ex. 43 | 100 (Low Mw) | 0 | −9 | −8.4 | −6.7 | −6.5 | −4.5 | −2.8 | −6.8 | −5.5 |

Note:
Low Mw = 21,700; High Mw = 29,600.

Data in Table 9 suggests that polycarbonate with an end cap ratio of close to 100 mol % (interfacial polycarbonate, Ex. 40) resulted in positive charged parts.

Data also indicates that polycarbonates with an end cap ratio of about 95 mol % (blends of melt and interfacial polycarbonates) exhibit an average electrostatic surface charge close to zero for 2.5 mm plaques and 3.2 mm disks (Ex. 27 of Table 5 and Ex. 31 of Table 7). However, bigger parts like fryer pan lids and headlamp lenses show a positive charge at these same end cap ratios of about 95 mol % (Exs. 38 of Table 8 and Ex. 42 of Table 9). For headlamp lenses a electrostatic surface charge close to zero kV was observed for melt process prepared polycarbonate with an end cap ratio of 83% (Ex. 39). This same polycarbonate resulted in a negative charge for smaller plaques (2.5 mm) and disks (3.2 mm) (Ex. 20 of Table 5). Also fryer pan lids from this same polycarbonate exhibit a negative charge (Ex. 43 of Table 9). Though the polycarbonate compositions are the same, the total weight of the molded part affects static charge. In this way, from the above observations, a neutral charged fryer pan lid can be obtained with a polycarbonate having an end cap ratio of 83 to 95 mol % (as determined using the correlations shown in FIG. 3, above).

In summary, it can be concluded that by adjusting the polycarbonate end cap ratio, molded parts exhibiting an electrostatic surface charge close to zero can be obtained. Smaller parts such as 2.5 mm plaques and 3.2 mm disks exhibiting an electrostatic surface charge close to zero require higher end cap ratio (about 95 mol %) compared to larger parts such as fryer pan lids and headlamp lenses (83 to 95 mol %).

The singular forms "a," "an," and "the" include plural referents unless the context clearly dictates otherwise. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. The endpoints of all ranges directed to the same component or property are inclusive of the endpoint and independently combinable. All references are incorporated herein by reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. The term "substituted" as used herein means that any at least one hydrogen on the designated atom or group is replaced with another group, provided that the designated atom's normal valence is not exceeded. When the substituent is oxo (i.e., =O), then two hydrogens on the atom are replaced. Also as used herein, the term "combination" is inclusive of blends, mixtures, alloys, reaction products, and the like.

As used herein, the term "hydrocarbyl" refers broadly to a substituent comprising carbon and hydrogen, optional with at least one heteroatoms, for example, oxygen, nitrogen, halogen, or sulfur; the term "alkyl" refers to a straight or branched chain monovalent hydrocarbon group; "alkylene" refers to a straight or branched chain divalent hydrocarbon group; "alkylidene" refers to a straight or branched chain divalent hydrocarbon group, with both valences on a single common carbon atom; "cycloalkyl" refers to a non-aromatic monovalent monocyclic or multicyclic hydrocarbon group having at least three carbon atoms; "cycloalkylene" refers to a non-aromatic divalent monocylic or multicyclic hydrocarbon group having at least three carbon atoms; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to a an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

An "organic group" as used herein means a saturated or unsaturated (including aromatic) hydrocarbon having a total of the indicated number of carbon atoms and that can be unsubstituted or unsubstituted with one or more of halogen, nitrogen, sulfur, or oxygen, provided that such substituents do not significantly adversely affect the desired properties of the composition, for example transparency, heat resistance, or the like. Exemplary substituents include alkyl, alkenyl, alkynyl, cycloalkyl, aryl, alkylaryl, arylalkyl, —NO$_2$, SH, —CN, OH, halogen, alkoxy, aryloxy, acyl, alkoxy carbonyl, and amide groups.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

We claim:

1. A method of preparing a polycarbonate composition, comprising:
melt blending a first polycarbonate prepared by interfacial polymerization and having hydroxy end groups that are capped with endcapping groups, with
a second polycarbonate prepared by melt polymerization and having hydroxy end groups that are capped with endcapping groups,
wherein the second polycarbonate has a lower mole percent of endcapping groups than that of the first polycarbonate;
wherein an article having a thickness of 3.2 mm and molded from the polycarbonate composition has a haze of less than 3 according to ASTM D1003-00, and
wherein a flat article molded from the polycarbonate composition has a surface charge of −2 to +2 kV.

2. The method of claim 1, wherein 80 to 95 mole percent of the hydroxy end groups present in the polycarbonate composition are capped with an endcapping group.

3. The method of claim 1, wherein greater than or equal to 97 mole percent of the hydroxy end groups of the first polycarbonate are capped with an endcapping group.

4. The method of claim 1, wherein 50 to 90 mole percent of the hydroxy end groups of the second polycarbonate are capped with an endcapping group.

5. The method of claim 1, wherein the amounts of the first polycarbonate and the second polycarbonate prior to melt blending are:
1 to 75 weight percent of the first polycarbonate, and
25 to 99 weight percent of the second polycarbonate;
wherein the weight percentages are based on the total weight of the first polycarbonate and the second polycarbonate.

6. The method of claim 1, wherein an article molded from the polycarbonate composition shows little or no dust patterns that are visible to the naked eye at a distance of about 18 inches upon exposure to dust.

7. The method of claim 1, wherein the endcapping groups are derived from an endcapping compound having the formula:

wherein Y is a hydrogen, halogen, $C_{1-6}$ alkyl group, $C_{1-3}$ alkoxy group, $C_{7-12}$ arylalkyl, alkylaryl, or nitro group; and y is 0 to 4.

8. The method of claim 7, wherein the endcapping compound is phenol or t-butyl phenol.

9. The method of claim 1, wherein the polycarbonate composition comprises repeating carbonate units derived from a bisphenol of the formula:

wherein
$R^a$ and $R^b$ each represents a halogen atom or a monovalent $C_1$-$C_{12}$ hydrocarbon group and can be the same or different;
p and q are each independently integers of 0 to 4; and
$X^a$ represents a single bond or one of the groups of formula:

wherein
$R^c$ and $R^d$ each independently represents a hydrogen atom or a monovalent $C_1$-$C_8$ linear alkyl or cyclic $C_4$-$C_8$ alkylene group; and
$R^e$ is a divalent $C_1$-$C_8$ hydrocarbon group.

10. The method of claim 9, wherein the polycarbonate composition comprises less than or equal to 0.001 wt % of residual bisphenol based on the total weight of the polycarbonate composition.

11. The method of claim 1, wherein the polycarbonate composition further comprises less than or equal to 1 wt % of an additive, based on the total weight of the polycarbonate composition.

12. The method of claim 11, wherein the additive comprises a flame retardant, a UV absorber, a plasticizer, a release agent, an antioxidant, or a combination comprising at least one of the foregoing additives.

13. The method of claim 1, wherein the polycarbonate composition does not comprise an antistatic agent.

14. The method of claim 1, wherein an article having a thickness of 3.2 mm and molded from the polycarbonate composition has a haze of less than 2 according to ASTM D1003-00.

15. The method of claim 1, wherein a flat article molded from the polycarbonate composition has a surface charge of −1 to +1 kV.

16. The method of claim 1, wherein a flat article molded from the polycarbonate composition has a surface charge of about 0 kV.

17. A polycarbonate composition prepared by the method of claim 1.

18. A molded article comprising the polycarbonate composition of claim 17.

19. The molded article of claim 18 wherein the molded article is a headlight lens for automotive applications.

20. A method of preparing a polycarbonate composition, comprising:
melt blending 1 to 75 wt % of a first polycarbonate prepared by interfacial polymerization and having hydroxy end groups, wherein greater than or equal to 97 mole percent of the hydroxy end groups are capped with an endcapping group, with
25 to 99 wt % of a second polycarbonate prepared by melt polymerization or interfacial polymerization and having hydroxy end groups, wherein 50 to 90 mole percent of the hydroxy end groups are capped with an endcapping group, wherein the wt % are based on the total weight of the first polycarbonate and the second polycarbonate;

wherein 80 to 95 mole percent of the hydroxy end groups present in the polycarbonate composition are capped with an endcapping group;

wherein an article having a thickness of 3.2 mm and molded from the polycarbonate composition has a haze of less than 3 according to ASTM D1003-00, and wherein a flat article molded from the polycarbonate composition has a surface charge of −2 to +2 kV.

21. A polycarbonate composition comprising:

a first polycarbonate having hydroxy end groups, wherein greater than or equal to 97 mole percent of the hydroxy end groups are capped with an endcapping group, and a second polycarbonate having hydroxy end groups, wherein 50 to 90 mole percent of the hydroxy end groups are capped with an endcapping group;

wherein 80 to 95 mole percent of the hydroxy end groups present in the polycarbonate composition are capped with an endcapping group;

wherein each of the first polycarbonate and the second polycarbonate comprises repeating carbonate units derived from a bisphenol compound;

wherein the polycarbonate composition has less than or equal to 0.001 wt % of residual bisphenol based on the total weight of the polycarbonate composition;

wherein the polycarbonate composition does not include an antistatic agent;

wherein an article having a thickness of 3.2 mm and molded from the polycarbonate composition has a haze of less than 3 according to ASTM D1003-00, and wherein a flat article molded from the polycarbonate composition has a surface charge of −2 to +2 kV.

22. The polycarbonate composition of claim 21, wherein:
the first polycarbonate is present in an amount of 1 to 75 wt %, and
the second polycarbonate is present in an amount of 25 to 99 wt %,
wherein the weight wt % are based on the total weight of the first polycarbonate and the second polycarbonate.

23. The polycarbonate composition of claim 21, wherein the polycarbonate composition further comprises less than or equal to 1 wt % of an additive based on the total weight of the polycarbonate composition.

24. A molded article comprising the polycarbonate composition of claim 21.

25. The molded article of claim 24, wherein an article molded from the polycarbonate composition shows little or no dust patterns that are visible to the naked eye upon exposure to dust.

26. A molded article for automotive headlight lens comprising a polycarbonate composition consisting essentially of:

a first polycarbonate having hydroxy end groups, wherein greater than or equal to 97 mole percent of the hydroxy end groups are capped with an endcapping group, and a second polycarbonate having hydroxy end groups, wherein 50 to 90 mole percent of the hydroxy end groups are capped with an endcapping group;

wherein 80 to 95 mole percent of the hydroxy end groups present in the polycarbonate composition are capped with an endcapping group;

wherein each of the first polycarbonate and the second polycarbonate comprises repeating carbonate units derived from a bisphenol compound;

wherein the polycarbonate composition has less than or equal to 0.001 wt % of residual bisphenol based on the total weight of the polycarbonate composition;

wherein the polycarbonate composition does not include an antistatic agent;

wherein an article having a thickness of 3.2 mm and molded from the polycarbonate composition has a haze of less than 3 according to ASTM D1003-00, and wherein a flat article molded from the polycarbonate composition has a surface charge of −2 to +2 kV.

27. A method of manufacturing an article comprising:
melt blending the first polycarbonate and the second polycarbonate to form the polycarbonate composition of claim 1;
extruding the polycarbonate composition; and
molding the extruded composition into an article.

28. The method of claim 27, wherein the extruding is done with a single screw extruder or a twin screw extruder.

* * * * *